US008402847B2

(12) United States Patent
Calandrini et al.

(10) Patent No.: US 8,402,847 B2
(45) Date of Patent: Mar. 26, 2013

(54) HYDROPHOBIC PROPERTY DEMONSTRATOR

(75) Inventors: Fabien Calandrini, Charenton-le-Pont (FR); Carole Nadolny, Charenton-le-Pont (FR)

(73) Assignee: Essilor International, Charenton le Pont (FR)

( * ) Notice: Subject to any disclaimer, the term of this patent is extended or adjusted under 35 U.S.C. 154(b) by 359 days.

(21) Appl. No.: 12/840,778

(22) Filed: Jul. 21, 2010

(65) Prior Publication Data

US 2011/0107856 A1  May 12, 2011

(30) Foreign Application Priority Data

Nov. 9, 2009 (FR) ...................................... 09 57907

(51) Int. Cl.
*G01N 33/00* (2006.01)
(52) U.S. Cl. ................................. 73/866; 73/73; 73/434
(58) Field of Classification Search .............. 73/73, 434, 73/866
See application file for complete search history.

(56) References Cited

U.S. PATENT DOCUMENTS

| 2005/0064209 A1 | 3/2005 | Haines et al. |
| 2006/0076288 A1 | 4/2006 | Mezhirov et al. |

FOREIGN PATENT DOCUMENTS

FR    2 886 652    12/2006

OTHER PUBLICATIONS

*Preliminary Search Report*, French Application FR0957907 (2 pages).

*Primary Examiner* — Hezron E Williams
*Assistant Examiner* — Rodney T Frank
(74) *Attorney, Agent, or Firm* — Occhiuti Rohlicek & Tsao LLP

(57) ABSTRACT

A hydrophobic property demonstrator (100) comprises an inclinable sample support (10) and an upper tank (20) for producing droplets ($G_A$, $G_B$) that fall onto a sample (A, B) placed on the support. The droplets are produced regularly with a constant size by selecting a profile and diameter of a hole (23, 24) at the bottom of the tank, and by maintaining a constant water level (N) in said tank. Such a demonstrator is particularly suited for demonstrating the efficiency of the hydrophobic behavior of spectacle lenses.

13 Claims, 1 Drawing Sheet

HYDROPHOBIC PROPERTY DEMONSTRATOR

CROSS-REFERENCE TO RELATED APPLICATIONS

This application claims priority to French Patent Application No. 0957907, filed on Nov. 9, 2009, the content of which is hereby incorporated by reference in its entirety.

The present invention relates to a hydrophobic property demonstrator. The invention may be particularly useful for demonstrating the hydrophobic behavior of spectacle lens.

The use of numerous manufactured articles is improved when these articles exhibit hydrophobic behavior. Such behavior is characterized by reduced spreading of a water droplet present on the surface of the article. When such hydrophobic behavior is efficient and the surface of the article is inclined, the water droplet rolls over the surface without sticking to the latter. In addition, if the water droplet strikes the surface with some speed the droplet may rebound from the surface, perhaps spattering, but without spreading at the point of impact.

Manufactured articles that are advantageously hydrophobic are for example, spectacle lenses, mirrors, windshields, liquid dispensing systems, tablecloths, container coatings, etc. It is then often necessary to demonstrate the efficiency of the hydrophobic function of the article, or to compare the efficiencies of different treatments that are intended to confer the hydrophobic function on the article.

A first object of the invention is thus to provide a system for presenting and assessing the hydrophobic behavior of a sample of a manufactured article.

A second object of the invention is to provide such system that is simple, stand-alone and inexpensive, that may be quickly installed and used during demonstration sessions or on display stands.

A third object of the invention is to permit the demonstration in a convincing, reliable and reproducible manner of the efficiency of a hydrophobic function.

To achieve these and other objects, the invention provides a demonstrator of a hydrophobic property of a sample, which comprises:

- a sample support, comprising at least one sample location arranged to expose one surface of the sample which is placed on this support, with an inclination of the surface of the sample with respect to a vertical direction;
- a upper tank which is designed to contain a quantity of deionized water, with at least one hole in the bottom of this tank, and which is located above the sample support so that water droplets fall one by one through the hole onto the surface of the sample; and
- a system for supplying the upper tank with deionized water, which is designed to maintain a substantially constant water level above the bottom of the tank.

According to one additional feature of the invention, the hole possesses a diameter and a bore profile which are designed so that the droplets form and fall spontaneously at regular time intervals.

A demonstrator according to the invention therefore comprises few separate elements, is light, compact and inexpensive, and may be assembled rapidly on a demonstration stand.

Furthermore, the combination of the characteristics of the hole with a constant water level in the upper tank ensures that the droplets fall regularly and constantly with reproducible and constant droplet size and impact speed of the water droplets onto the surface of the sample. A demonstrator according to the invention is therefore particularly reliable. In addition, the use of deionized water ensures that the hole is not even partially obstructed after prolonged use.

In preferred embodiments of the invention, the hole may possess a bore which is cylindrical in a upper part of the hole, and a bore which is conical in a lower part of the same hole, with a bore diameter which increases towards the lower part of the hole. Such a hole profile produces very reproducible droplets, at an almost constant flow rate. In particular, increasing the hole diameter towards the base reduces the tendency for capillary action and the surface tension of the water to stop detachment of the droplets.

In various embodiments of the invention, particularly advantageous for efficiently demonstrating the hydrophobic property of a sample, at least one of the following improvements may be used individually or in combination with others:

- the demonstrator may be designed so that the droplets form and fall through the hole with a frequency which is between 0.2 Hz and 2 Hz;
- the bottom of the upper tank may have a thickness which is between 2.5 mm and 3.5 mm at the location of the hole, the cylindrical bore of the upper part of the hole may possess a diameter which is between 0.6 mm and 0.8 mm, the conical bore of the lower part of the hole may possess a half-angle which is between 10° and 30°, and the cylindrical and conical bores may have a junction which is located between 0.25 mm and 2 mm from a lower external surface of the bottom of the upper tank;
- the shape of the upper tank and the system for supplying deionized water may be designed so that the quantity of water which is contained in the upper tank with a substantially constant water level produces a hydrostatic pressure of between 2.5 mbar and 5 mbar at the position of the hole;
- the demonstrator may furthermore comprise a lower tray placed to recover the droplets after they have fallen onto the surface of the sample;
- the system for supplying the upper tank with deionized water may comprise a pumping device for refilling the upper tank with the deionized water contents of the lower tray;
- the sample support may be designed for variably adjusting the inclination of the surface of the sample with respect to the vertical direction; and
- the drop height of the droplets, which is measured between the hole and a point of impact of the droplets on the surface of the sample, may be between 5 cm and 20 cm, preferably between 7 cm and 15 cm.

In preferred versions of the invention, the sample support may comprise several sample locations which are arranged to expose the respective surfaces of at least two samples placed side by side on the support, with the same inclination of these sample surfaces with respect to the vertical direction. The upper tank is then provided with at least two identical holes which are each one located directly above the sample locations so that the identical droplets form and fall onto the respective surfaces of the samples. Such demonstrator allows the hydrophobic properties of several samples to be demonstrated at the same time, so as to compare their efficiencies, visually and directly, in real time.

For particular applications of a demonstrator according to the invention in the ophthalmic field, the sample support may be designed to receive at least one spectacle lens which forms the sample, so that the droplets fall onto a surface of this spectacle lens.

Other features and advantages of the present invention will become apparent from the description below of a non-limiting embodiment, with reference to the appended drawings in which.

For the sake of clarity, the elements represented in the figures are not to scale. Furthermore, identical references in different figures denote identical elements.

Figure 1:
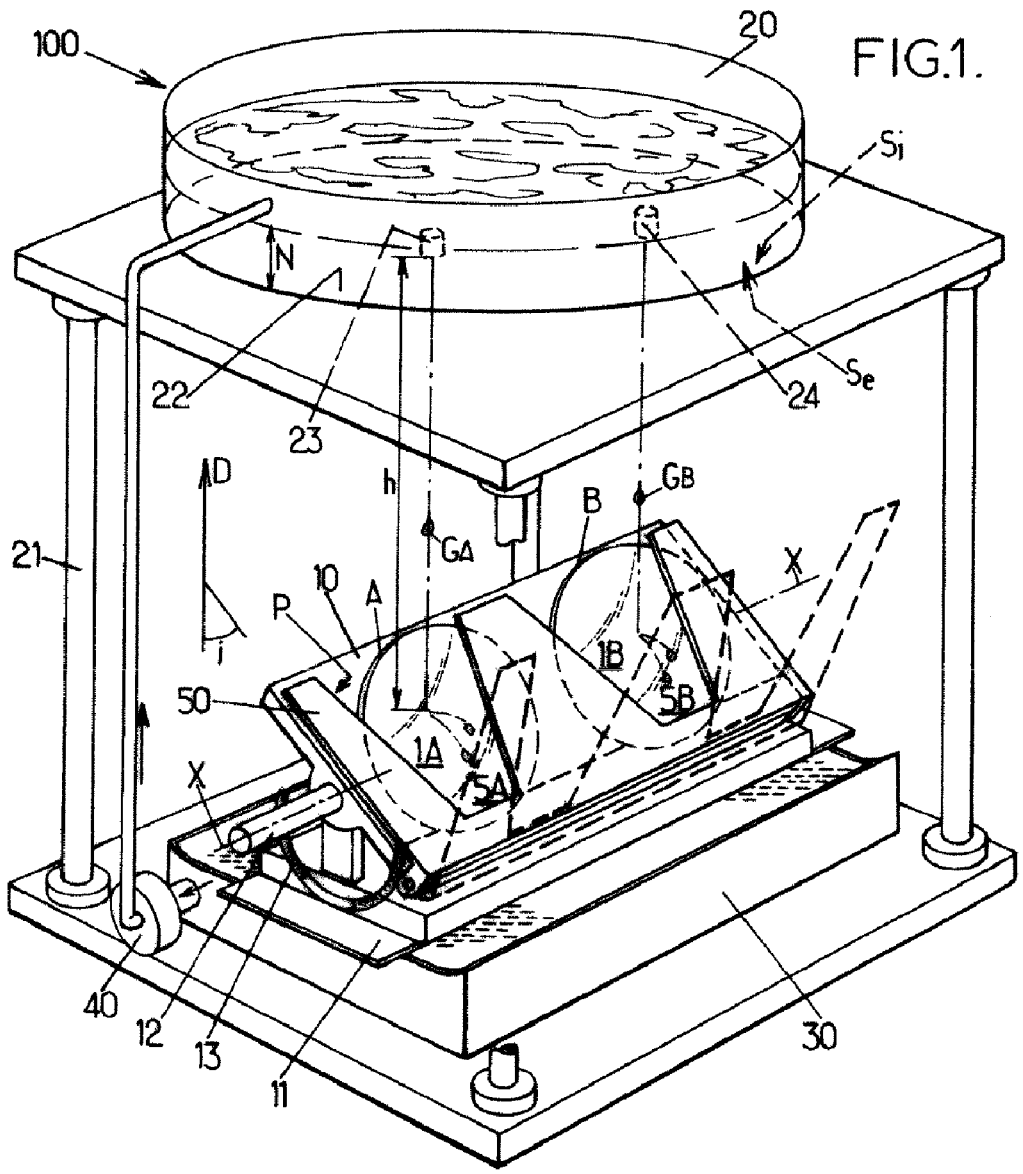
FIG. 1 is a perspective view of a demonstrator according to the invention.
Figure 2A:
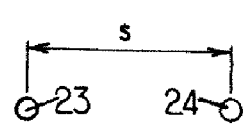
FIGS. 2a and 2b are diagrams of the construction that indicate the dimensions used.
Figure 2B:
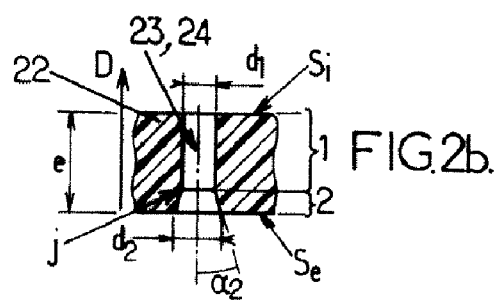

In FIGS. 1 and 2b, D denotes a vertical direction that points upwards. The direction D is thus parallel to the Earth's gravity where the demonstrator is installed, but in the opposite sense to gravity.

The invention will now be described in the context of demonstrating the hydrophobic properties of spectacle lenses. Such spectacle lenses may have a diameter of 65 mm, for example. This application is given by way of illustration, it being understood that the embodiment of the invention now described may be adapted to other manufactured articles, with the aim of demonstrating the hydrophobic behavior of these articles.

Furthermore, the demonstrator described below is designed to demonstrate the hydrophobic behavior of two spectacle lenses simultaneously, so as to allow them to be directly compared. But, it is understood that this description may be adapted to any number of spectacle lenses tested at the same time, or even to demonstrate only one spectacle lens at a time.

Moreover, and in a general manner, the hydrophobic behavior for which the demonstrator is used may be a property of the bulk material that constitutes the manufactured article, especially spectacle lenses. Alternatively, the hydrophobic behavior may be conferred on the article by a surface treatment, by a layer which is deposited on the surface or by a film or a laminated structure which is added to the surface of the article or the spectacle lens.

With reference to FIG. 1, the demonstrator which is given the overall reference 100 comprises a sample support 10, an upper tank 20, a recovery tray 30 and a pumping device 40.

The support 10 comprises two locations 1A and 1B for receiving two spectacle lenses A and B. These two spectacle lenses A and B are supported in the same plane P, the inclination i of which with respect to the vertical direction D may be adjusted. To do so, the support 10 is mounted so as to be able to rotate, about an axis X-X, with respect to a base part 11 of the support 10. A handle cylinder 12 and an angular graduation 13 allow the inclination i to be adjusted, the latter then remaining constant.

The tank 20 is supported by a structure 21 a constant height h above the surface of the lenses A and B. The height h, called the drop height of the water droplets, may be equal to 10 cm. For example, the tank 20 may be of cylindrical shape and vertical axis with a horizontal bottom 22, an internal diameter of 119 mm and an internal depth which is greater than 40 mm. The tank 20 is intended to contain deionized water during operation of the demonstrator 100. Moreover, the tank 20 is open at the top so that the water that it contains is at ambient atmospheric pressure on its upper free surface.

The bottom 22 of the tank 20 is provided with two holes 23 and 24. When the spectacle lenses each have a diameter of 65 mm, the holes 23 and 24 may be 100 mm apart (FIG. 2a). In general, the holes 23 and 24 are each located directly above, along the vertical direction D, a central part of the lenses A and B, the hole 23 above the lens A and the hole 24 above the lens B. Thus, when the tank 20 contains deionized water, droplets $G_A$ and $G_B$ form in the openings of the holes 23 and 24, respectively, and fall onto the surfaces of lenses A and B which are upwardly displayed.

The inclination i of the surfaces of the lenses A and B is chosen to demonstrate the hydrophobic properties of the upper surfaces of the lenses A and B, when the droplets $G_A$ and $G_B$ fall onto these surfaces. Furthermore, the inclination i then allows the water droplets $G_A$ and $G_B$ to be spontaneously removed from the surfaces of the lenses A and B. For example, the inclination i may be equal to about 45°.

The tray 30 and the pumping device 40 are not compulsory, but they do allow the deionized water to be used in a closed circuit. To do so, the tray 30 is located beneath the support 10 so as to receive the water that flows off the lenses A and B, and the pumping device 40 sends this water back into the upper tank 20. It is then unnecessary to periodically refill the demonstrator 100 with deionized water, and the regulation of the water level N in the upper tank 20 may be automatic. The device 40 may operate continuously or intermittently, while still maintaining the water level N in the upper tank 20 at a value that is sufficiently constant for the droplets $G_A$ and $G_B$ to fall regularly with constant droplet size. Advantageously, the pumping device 40 may be a small-capacity peristaltic pump powered with batteries. A system for detecting the water level N may optionally be used in the tank 20, but a permanent operation of the pumping device 40 may ensure that the tray 30 is always almost empty, so that the fill level of the tank 20 remains roughly constant at its initial value during operation of the demonstrator 100.

The two holes 23 and 24 are identical. Each of the holes 23 and 24 has a diameter and a profile that are adjusted depending on the nominal height of the water in the tank 20. In a known manner, this water height determines the hydrostatic pressure existing at the bottom 22 of the tank 20 and therefore in the openings of the holes 23 and 24. This relation between the hole dimensions and the hydrostatic pressure determines the size of the water droplets that fall from each hole and their frequency.

In particular, no activation system is necessary to trigger the formation or the drop of each water droplet. The demonstrator 100 of the invention is therefore particularly simple and inexpensive.

In one embodiment which is given by way of example, each hole 23, 24 comprises a cylindrical upper part which is referenced 1 and a conical lower part which is referenced 2, so that the hole opening is larger at the lower external surface $S_e$ of the bottom 22 (FIG. 2b). The cylindrical part of each hole allows a regular leak rate to be fixed, whereas the conical part prevents capillary action and the surface tension of the droplets from inhibiting the detachment of each droplet. This embodiment provides a droplet flow rate that is particularly regular and suited for demonstrating the hydrophobic behavior of spectacle lenses A and B.

For example, the deionized water level N in the container 20 may be approximately 35 mm, measured from the upper internal surface $S_i$ of the bottom 22. This level N value corresponds to a hydrostatic pressure of 3.5 mbar in the holes 23 and 24. When the container 20 has a cylindrical shape with a diameter of 119 mm as indicated above, it contains a quantity, 350 ml, of deionized water which is almost constant during the operation of the demonstrator 100.

The following numerical values are given by way of example:

bottom 22 thickness: approximately 3.0 mm;

diameter $d_1$ of the cylindrical upper part 1 of each hole 23, 24: approximately 0.7 mm;

half-angle $\alpha_2$ at the top of the conical lower part of each hole 23, 24: approximately 10°;

height of the junction j between the cylindrical upper part and the conical lower part of each hole 23, 24: approximately 0.7 mm; and diameter $d_2$ of the cylindrical lower part 2 of each hole 23, 24, at the opening in the lower external surface $S_e$ of the bottom 22: approximately 0.8 mm.

Under these conditions, each hole 23, 24 produces droplets $G_A$, $G_B$ with a frequency of around 1 Hz.

To make the observation of the hydrophobic behavior of the spectacle lenses A and B easier, the demonstrator 100 may furthermore comprise a cover plate assembly 50 which is placed above the sample support 10. The cover plate assembly 50 has an opening 5A, 5B facing a central part of each of the spectacle lens locations 1A and 1B. The droplets $G_A$ and $G_B$ respectively, then pass through this opening, 5A and 5B respectively, before arriving at the exposed surface of the spectacle lens, A and B respectively, through the opening.

According to an optional improvement of the cover plate assembly 50, each of the openings, 5A and 5B respectively, may possess a profile flared towards one edge of the spectacle lens, A and B respectively, this edge being raised by the inclination i of the spectacle lens. Such a design of the cover plate assembly 50 focuses the attention of an observer on the impact of the droplets on the surface of the lenses. The efficiency of the demonstrator 100 is therefore further increased in this manner.

Optionally, the cover plate assembly 50 may be removable or may rotate, to make positioning the spectacle lenses A and B in the locations 1A and 1B easier.

Finally, it will be recalled that the embodiment described in detail above was given merely by way of example to allow the invention to be directly reproduced. However, it is understood that the numerical values and the shapes that were mentioned may be adapted depending on the articles in question and the characteristics required of the droplets.

The invention claimed is:

1. Demonstrator of a hydrophobic property of a sample, said demonstrator comprising:
   a sample support, comprising at least one sample location arranged to expose one surface of the sample placed on said support, with an inclination (i) of the surface of the sample with respect to a vertical direction (D);
   a upper tank designed to contain a quantity of deionized water, with at least one hole in the bottom of said tank, and located above the sample support so that water droplets ($G_A$, $G_B$) fall one by one through said hole onto the surface of the sample; and
   a system for supplying the upper tank with deionized water, designed to maintain a substantially constant water level (N) above the bottom of the tank, in which the hole possesses a diameter and a bore profile designed so that the droplets form and fall spontaneously at regular time intervals.

2. Demonstrator according to claim 1, designed so that the droplets ($G_A$, $G_B$) form and fall through the hole with a frequency of between 0.2 Hz and 2 Hz.

3. Demonstrator according to claim 1, in which the hole possesses a cylindrical bore in a upper part of said hole, and a conical bore in a lower part of said hole, with a bore diameter which increases towards the lower part of the hole.

4. Demonstrator according to claim 3, in which the bottom of the upper tank possesses a thickness (e) of between 2.5 mm and 3.5 mm at the location of the hole, the cylindrical bore of the upper part (1) of the hole possesses a diameter ($d_1$) of between 0.6 mm and 0.8 mm, the conical bore of the lower part of the hole possesses a half-angle ($\alpha_2$) of between 10° and 30°, and the cylindrical and conical bores have a junction (j) located between 0.25 mm and 2 mm from a lower external surface ($S_e$) of said bottom of the upper tank.

5. Demonstrator according to claim 1, in which the shape of the upper tank and the system for supplying deionized water are designed so that the quantity of water contained in said upper tank with the substantially constant water level (N) produces a hydrostatic pressure of between 2.5 mbar and 5 mbar at the location of the hole.

6. Demonstrator according to claim 1, furthermore comprising a lower tray placed so as to recover the droplets ($G_A$, $G_B$) after they have fallen onto the surface of the sample.

7. Demonstrator according to claim 6, in which the system for supplying the upper tank with deionized water comprises a pumping device for refilling the upper tank with a deionized water content of the lower tray.

8. Demonstrator according to claim 1, in which the sample support is designed for variably adjusting the inclination (i) of the surface of the sample with respect to the vertical direction (D).

9. Demonstrator according to claim 1, in which a drop height (h) of the droplets ($G_A$, $G_B$), measured between the hole and a point of impact of said droplets on the surface of the sample, is between 5 cm and 20 cm, preferably between 7 cm and 15 cm.

10. Demonstrator according to claim 1, in which:
    the sample support comprises several sample locations, said locations being arranged to expose respective surfaces of at least two samples placed side by side on said support, with the same inclination (i) of said sample surfaces with respect to the vertical direction (D); and
    the upper tank is provided with at least two identical holes, each one located directly above the sample locations so that identical droplets ($G_A$, $G_B$) form and fall onto the respective surfaces of the samples.

11. Demonstrator according to claim 1, in which the sample support is designed to receive at least one spectacle lens (A, B) forming the sample, so that the droplets ($G_A$, $G_B$) fall onto a surface of said spectacle lens.

12. Demonstrator according to claim 11, furthermore comprising a cover plate assembly placed above the sample support with an opening located facing a central part of each spectacle lens location, the droplets ($G_A$, $G_B$) passing through said opening before arriving at the exposed surface of the spectacle lens (A, B) through the opening.

13. Demonstrator according to claim 12, in which each opening of the cover plate assembly possesses a profile flared towards one edge of the corresponding spectacle lens (A, B), said edge being raised by the inclination (i) of said spectacle lens.

* * * * *